April 21, 1964     W. C. HODGES     3,129,926
DEVICE FOR MIXING CHEMICALLY REACTIVE INGREDIENTS
Filed June 20, 1960     2 Sheets-Sheet 1
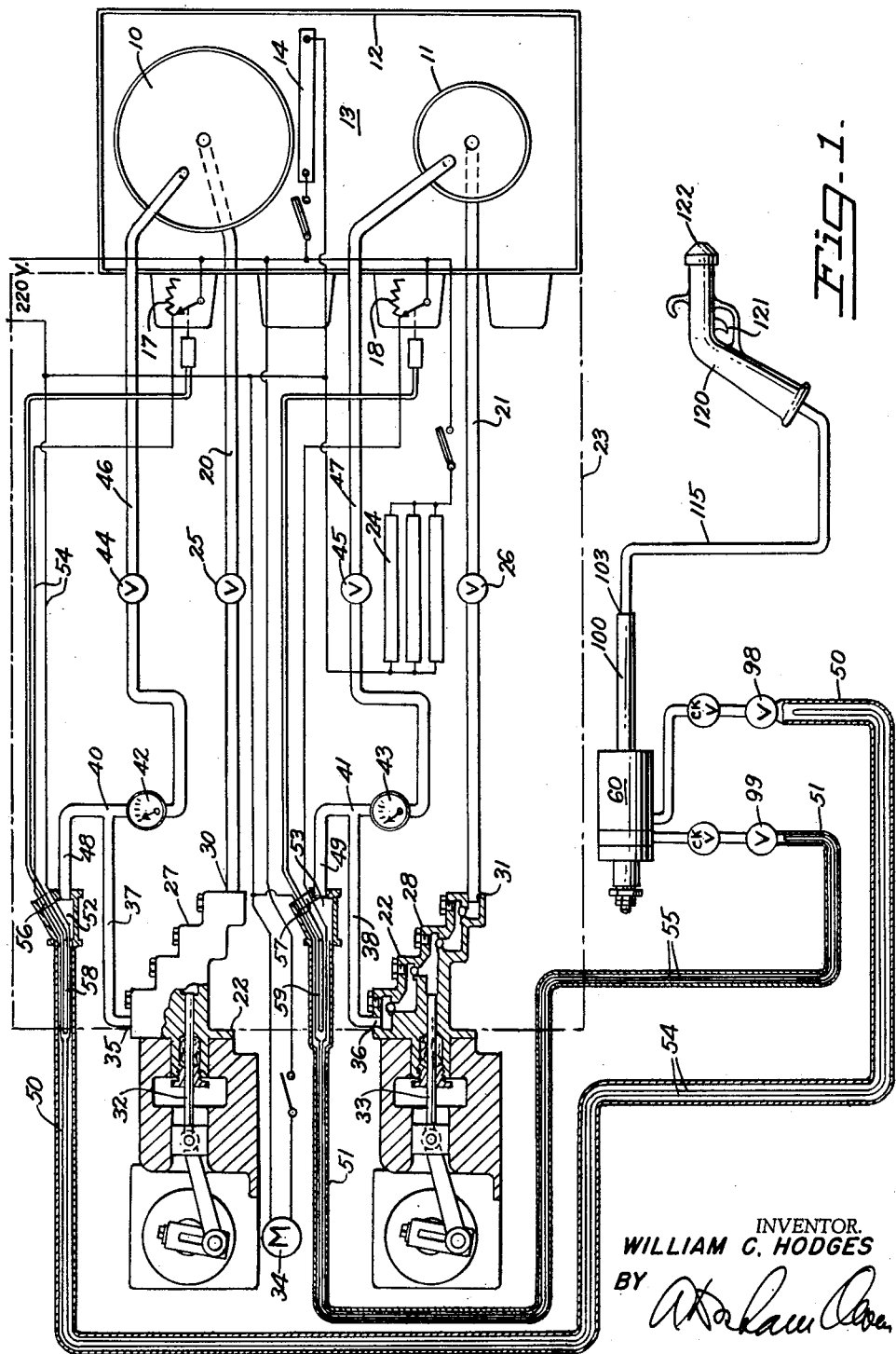
INVENTOR.
WILLIAM C. HODGES
BY
ATTORNEY.

April 21, 1964     W. C. HODGES     3,129,926
DEVICE FOR MIXING CHEMICALLY REACTIVE INGREDIENTS
Filed June 20, 1960     2 Sheets-Sheet 2
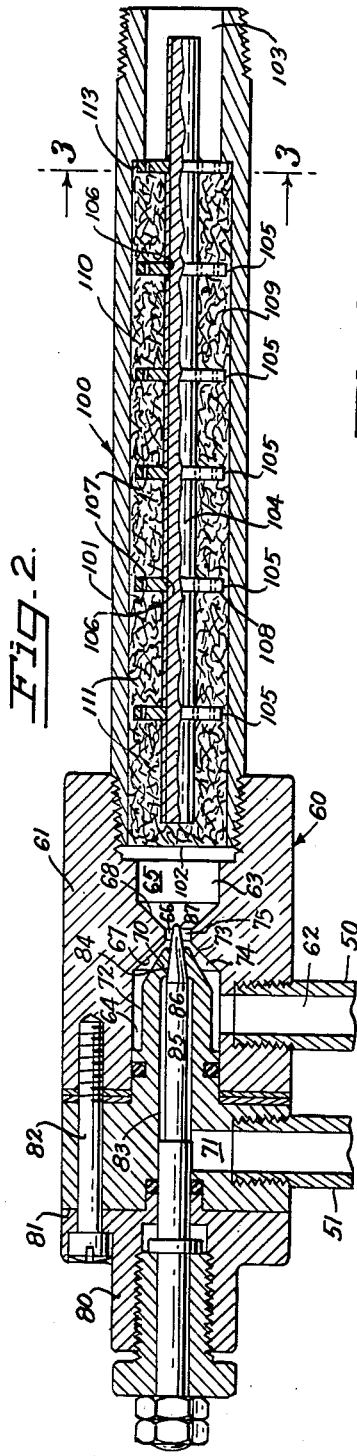
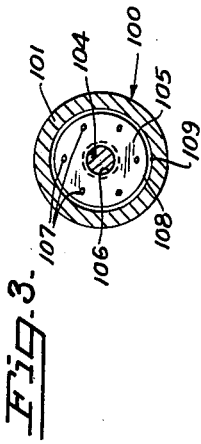
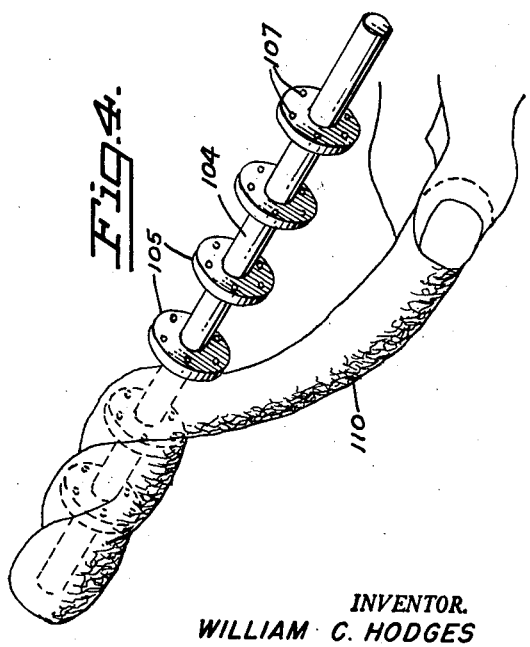
INVENTOR.
WILLIAM C. HODGES
BY
ATTORNEY.

United States Patent Office 3,129,926
Patented Apr. 21, 1964

3,129,926
DEVICE FOR MIXING CHEMICALLY
REACTIVE INGREDIENTS
William C. Hodges, Palo Alto, Calif., assignor to Hodges Chemicals Company, a corporation of California
Filed June 20, 1960, Ser. No. 37,464
1 Claim. (Cl. 259—4)

This invention relates to a surface coating apparatus. More particularly, it relates to apparatus for quickly and intimately mixing a plurality of mutually chemically reactive materials. Put another way, the invention relates to a device for mixing a plurality of materials that react with each other chemically, so that they can immediately be applied to surfaces. It relates particularly to the combination of certain plastics with their curing agents or catalysts, both the catalyst and plastics being "100% solids" (non-solvent) and 100% reactive, which react completely to form a thermosetting material that solidifies rapidly. Such materials may be used as protectants against chemical or corrosive attack, as adhesives for bonding two members together, as finishes resistant to abrasion, wear, and shock, as sealants, as decorative coatings or finishes, and as non-slipping safety surfaces. This application is a continuation-in-part of application Serial Number 817,017, filed May 4, 1959, which was a division of application Serial Number 749,791, filed July 21, 1958.

Certain chemically reactive compounds, such as polyepoxides combine with catalysts or curing agents, such as certain amines, to form reaction products that under certain temperature conditions become solid or too viscous to flow within a very short period of time—a matter of a few seconds or less. Some of these solidified reaction products have usually fine qualities that make them of great utility as protective and decorative coatings for many types of surfaces and as bonding and cementing agents for many materials. However, it has been very difficult to combine these reactive compounds with their catalysts and to apply the resulting mixture in a single continuous operation. In the first place, the starting materials are usually very viscous at normal temperatures. Second, the chemical reaction takes place rapidly but does not proceed uniformly unless the materials are mixed very thoroughly and very quickly, for if there is insufficient mixing, some of the material fails to cure and some parts of the mass contain an excess of catalyst, and the product will not be sufficiently strong nor will it attain the full measure of its inherent properties. Third, the quantity relationship between the catalyst and the base plastic is often quite critical, lying within a range of plus or minus 5%; so an excess or a deficiency of the catalyst grossly affects the final product. Fourth, the reaction product is thermosetting, and once the reaction has proceeded to completion, the material cannot be remelted. Once hard, it stays hard.

In the past, the difficulty of properly combining the catalyst and plastic and of applying them soon enough after mixture has been so great that solvent application has been resorted to. The use of suitable solvents or diluents can give low viscosity fluids which can be handled more easily and can be applied by conventional painting apparatus such as brushes, rollers, or air sprays. However, all methods utilizing solvents have serious disadvantages. The films so applied are very thin when dry—in the order of one or two mils of "dry film thickness" per layer—and thicker films can be obtained only by applying several coats, and between coats the previous coating has to cure and the solvent has to evaporate. The percentage of solids in a mixture of the required viscosity enabling conventional application methods, is in the range of 10% to 50%, the remainder being the evaporable solvent. Not only does it take time for the solvent to evaporate, but when it does evaporate from the relatively thin film that has been applied, it leaves voids and holes in the film. It has been found that each coat of a solvent system is pervious and the total film can be made impervious only to a degree, even after many coats, because of holes in each coat. Each layer takes considerable time to apply and more time to dry and requires the same amount of labor as applying a single thick layer would take, if it were possible to apply such a layer. In addition, the volatile solvents are commonly toxic, inflammable, or explosive, and their use is therefore undesirable in many applications and is extremely dangerous in some. Air mixing is also undesirable, since air bubbles are formed in the coating, and the coating therefore lacks continuity.

Furthermore, it has been proved that relatively thick layers (4 to 6 mils) of even very low solvent combinations, on the order of 10% solvent, never entirely give up their solvent content, even after continued subjection to heat on the order of 200° F. for 24 hours or boiling in water for several days after supposed cure. The chemical resistance of these solvent-type coatings is measurably less than that of 100% solids films of the same resin-hardener combinations less solvent. This implies that total reactivity between resin and hardener is inhibited to a harmful degree by the entrapment and continued presence of even very small amounts of carrier solvents in the resin-hardener mixture.

It has therefore long been desirable to apply undiluted, undissolved 100%-solids, thermosetting resins as a film or coating. But how to do so has been the problem. It is impractical to apply a base plastic first and then apply the catalyst, and the results from such attempts are unsatisfactory. It is also impractical to mix the material in a pot and then apply it quickly, because only small batches can be mixed and applied at a time. In fact, many methods have been tried, but up to now, all have been unsatisfactory for the epoxies and similar products.

The present invention overcomes the limitations of the prior method and makes possible direct application of films and coatings of this type. It eliminates solvents and their accompanying inflammability, toxicity, and tendency to explode. Films applied by the method of this invention may be from 5 to 60 mils thick in a single application and can be applied without voids, holes, or entrapments of other materials. A completely impermeable, thick layer may be applied in a single application. Moreover, the films and coatings possess the ultimate physical and chemical properties of the combined materials.

Tests have proven that a single coat applied by my non-solvent system is less porous than many layers applied by a solvent using the same basic ingredients and of the same total thickness.

An additional advantage of my completely reactive system applied at elevated temperatures is that part of the total chemical reaction between them takes place even before the combined material reaches the target. Two very distinct advantages accrue thereby to the employer of the present invention; less time-temperature is required to cure the mixture thus applied and the greater thixotropy resulting from this partial cure before the combined material reaches its target allows for thicker films to be applied without sagging. Furthermore, thicker films complete their cure faster than thinner films because the heat of their reaction is retained to a larger degree by their greater mass-area relationship.

Among the objects of this invention are the following: to provide a system for mixing a base resin with a catalyst without the use of solvents or diluents; to mix reactive materials under continuous flow conditions, so that they can be sprayed onto the surface to be treated immediately after mixture; to provide a system where combined materials cure partially before they reach the target and continue to cure at a faster rate than do even thinner films of solvent-types of coatings; and to provide a lightweight, simply constructed, rugged mixing-valve-chamber-gun combination that can be employed at relatively low expense and without undue care and experience and without overtaxing the strength of an average operator.

It has been found very difficult to mix properly the very viscous plastic and viscous catalyst, especially in a continuous-flow machine. In such a machine, one cannot use paddle wheels or other conventional mixers, but must relay upon the drive of the pumping system that forces the viscous material through the conduits. The present invention has done this by providing a novel mixing chamber wherein the pumping force is utilized to achieve a thorough, intimate, and uniform mixing of the materials.

While the invention has been described heretofore and will be described subsequently principally in terms of two mutually reactive materials, it will be understood that there may be more than two of these reactive materials, for the invention is applicable in the same manner to any number of such materials by using a series of valves to mix two ingredients at a time, each time preferably adding the smaller ingredient into the center of the larger ingredient. Similarly, it will be understood that while the epoxide resins are used as an example, the invention is, of course, applicable to other types of thermosetting resins formed by mixing two or more chemically reactive materials.

In general, it may be said that a novel type of labyrinthine mixing chamber is placed immediately after the combining valve and immediately preceding the spray head or other apparatus for atomizing and projecting the proportioned and mixed ingredients upon a target.

As understood in the industry, the term "catalyst" includes separate reactive ingredients that act on the main ingredient to produce curing or hardening, as well as agents that give true "catalytic" action as that term is used by chemists. The present application uses the term "catalyst" in this broader sense in both the specification and claim.

Further explanation as well as other objects and advantages of the invention will appear from the following description of a preferred embodiment, given in accordance with the requirements of 35 U.S.C. 112.

In the drawings:

FIG. 1 is a somewhat diagrammatic representation of a proportioning, mixing and coating application system embodying the principles of the present invention.

FIG. 2 is a view in elevation and in section, on an enlarged scale, of the combining valve (in its catalyst-stream-closed position) and the mixing chamber.

FIG. 3 is a view in vertical section taken along the line 3—3 in FIG. 2.

FIG. 4 is a view of the mixing chamber during manufacture showing the metal ribbons being installed.

As shown in FIG. 1, separate vessels 10 and 11 may be provided for each basic ingredient. One vessel or container 10 may hold a polyepoxide (or other) type of resin together with inert fillers (such as pigments), reactive accelerators, reactive flow control agents, and all other materials that are not reactive with the epoxide resin itself, or are at least not further reactive therewith until the so-called catalyst or curing agent is added. The other vessel or container 11 holds another ingredient or group of ingredients that do not react further with each other but which are reactive with the ingredients in the container 10, once they are combined. Thus, when the container 10 holds the base epoxy resin, the container 11 holds the catalyst, such as metaphenylenediamine. If there are additional ingredients that are reactive with either or both of the ingredients in container 10 or 11, then they should be kept in a separate container and handled in a similar manner.

As described in my co-pending application, Serial Number 749,791, a heating system is preferably employed throughout in order to maintain the materials at proper viscosities. For example, the containers 10 and 11 may be housed in a larger container 12 providing a water bath 13 and heating means for the water bath, such as electric heating elements 14. The containers 10 and 11 are maintained at a temperature that is cool enough to prevent damage to the contained ingredients and cool enough so that at the final stage of mixing the reaction will be at a desired rate of speed, while at the same time being hot enough to assure a workable viscosity, so that the fluids flow properly. Proper proportioning, mixing and transmission of the various combinations of starting materials is dependent upon the degree of fluidity of the materials; so the success of the final applied product is contingent upon maintenance of the proper fluid viscosity for the ingredients. One way to further assure proper viscosity under differences in weather and in fluctuating of voltage in the power supply, is to maintain a constant voltage throughout the electrical heating circuit. For example, two thermostatically controlled rheostats 17 and 18 are shown in FIG. 1, which maintain a constant wattage in their respective lines, each of them being adjustable to give the proper wattage for its particular component. As a result, the proper temperature level of the heating elements in various places is maintained at a constant level, with control of that level.

Conduits 20 and 21 lead respectively from containers 10 and 11 to a proportioning pump 22, which is preferably at a level below the containers 10 and 11 to give gravity flow. To insure maintenance of the proper viscosity, the pump 22 and conduits 20 and 21 may be housed inside an oven 23 having an electrical heater 24. A valve 25, 26 is provided in each conduit 20, 21 to cut off or permit flow from the respective tank 10, 11.

The proportioning pump 22 has two pump elements 27 and 28, one for each of the conduits 20 and 21 and connected thereto by an inlet 30 or 31. The proportioning pump 22 may be a positive displacement, reciprocating, duplex-type of controlled volume pump. Such a pump is manufactured by the Milton Roy Company of Philadelphia, Pennsylvania and is described and claimed in U.S. Patents 2,263,429 and 2,367,893. For use in the present invention, the pump 22 is preferably modified so that both pistons 32, 33 operate in phase, with simultaneous suction and discharge strokes.

Outlets 35, 36 from the respective elements 27, 28 open into a resin conduit 37 and a catalyst conduit 38. Each conduit 37, 38 leads to a respective T 40, 41, whence one arm leads to a pressure gauge 42, 43 and thence to a return valve 44, 45. When the valve 44, 45 is open, material can pass therethrough and through return line 46 or 47 back to its tank 10 or 11, being forced there by the pump 22. Even when the valves 44, 45 are closed, the gauges 42, 43 will show the correct pressure in the lines 37, 38. The other arm of the T 40, 41 leads by lines 48, 49 and Y-fittings 52, 53 respectively to a main resin conduit 50 and a main catalyst conduit 51.

Both conduits 50, 51 are substantially nonexpansible, so that their volume is unaffected by the pressure of the contained viscous fluid. Solid metal pipes may be usable in some applications, but generally flexibility is desired or even necessary to give sufficient mobility at the spraying head; therefore, nonexpanding, metal-clad hoses are preferable. Being nonexpansible, the conducting hoses 50, 51 maintain correct the volume relationship of the two liquids after they have been correctly proportioned, for the pump 22 expels the material in pulses, and if these pulses swell either of the hoses, the proportions at the ends of the hoses 50, 51 are no longer the same as at the pump elements 27, 28. Contained in these hoses 50, 51 are respective loops of suitable resistance wire 54, 55. The wires 54, 55 are introduced into their hose lines 50, 51 through the Y-fittings 52, 53 at the pump end of each hose, where they are encased in an epoxy sealing plug 56, 57 to form a pressure-tight, heat-resistant, chemically-resistant insulating seal. Through the same plugs thermostats 58, 59 are sealed into a portion of the conduits 50, 51. By varying the temperatures so that the naturally less viscous substance is hotter, the pressure conditions within the lines 50 and 51 may be kept substantially equal.

The conduits 50, 51 lead to a combining valve 60 that is described and claimed in application Serial Number 817,016, filed May 4, 1959. The valve 60 combines the separate ingredients in a way that predisposes them to mixing but yet prevents them from ever solidifying within the valve and so prevents their leaving residual quantities of reacted or curable materials in the valve after the flow has been stopped. Such residues could impede the passageways and interfere with the critical ratio of the quantities of succeeding charges of materials.

The valve 60 includes a body 61 having a radially extending inlet 62 for the base resin, which is connected to the conduit 50, and a central passage 63, which comprises an inlet portion 64 connected to an outlet portion 65 by a neck or venturi 66. The venturi 66 is connected to the portions 64 and 65 by conical walls 67 and 68 extending at about 45° each.

A nose member 70 fits into the body 61 and is provided with a radial inlet 71 connected to the hose 51. The nose member 70 has a tubular portion 72 fitting into the axial passageway 64 and a conical nose 73, making an angle of about 30° with its axis and adjusted to lie close to but spaced from the narrow neck 66. Thus, an annular chamber 74 is formed by the converging (as they move inwardly) wall 67 and the nose 72 which lie at about 30°, leaving an orifice 75 through which the plastic can pass from the inlet 62 through the neck 66. An end collar 80 abuts the rear face 81 of the nose member 70, and cap screws 82 extend through the collar 80 and nose member 70 into the body 61 to hold the three members together.

The nose member 70 is provided with an axial passage 83 extending its full length and so communicating with the body passage 63 adjacent the neck 66. The passage 83 has a tapered axial outlet opening or seat 84, where walls lie at about 15°. A needle valve 85 is mounted for axial movement in the passage 83 and has a conical end 86 adapted to seal against the tapered seat 84 and to be of the same conical slope, so as to close off the outlet 84 completely when in one position or, when retracted back away from it, to permit the passage of viscous liquid from the inlet 71 into the passage 63.

Thus, the catalyst enters into the center of the plastic material coming from the annular chamber 74 as an injection into the center of the neck 66. The venturi neck 66 speeds up flow at this point, and the material is speeded away from this constricted portion into the passage 65. The needle valve's end 87 projects out beyond the end of the nose member 70 into the neck 66; the base plastic material comes down around the closed valve end 87 and wipes it clean of any catalyst material remaining thereon and carries that away; so after this wiping and carrying away, there will be no reactive materials within the valve, the catalyst being shut off completely behind the seat 84, while the plastic is passing freely as before until such time as its flow is likewise cut off. Flow is therefore kept until the wiping action is complete, and until the mixing chamber 100, which will be described later, is cleaned of reacting catalyst-resin mixture and is charged with resin in such excess that no harmful reaction will take place to plug the system.

Shutoff valves 98 and 99 are positioned in each hose between the pump and the combining valve 60, so that a cutoff can be obtained at this point. When valves 98 and 99 are closed and valves 44 and 45 are opened, continued action of the pump will merely return the ingredients to their respective reservoirs 10 and 11 and need cause no trouble. The catalyst thus moves from the hose 51 through the inlet opening 71 into the passage 83 and around the needle valve 85 and, when the valve 85 is retracted from its seat 84, enters the neck passage 66 at the center thereof. The catalyst flow can be stopped completely by closing the valve 85 against its seat 84.

The uncatalyzed resin meanwhile passes from the hose 50 through the radial inlet 62, through the annular chamber 74 around the cone-shaped nose and enters the neck 66 at the nose end 87 of the needle 85. At this point the resin for the first time comes into contact with the catalyst material while both are impelled under pump pressure and under venturi conditions toward the outlet passage 65 of the combining valve. The entering resin conforms to the annular shape of the passage and flows under pressure through the narrow passage 66 while enveloping the stream of catalyst also flowing under pressure past the cone-shaped end of the needle valve 85. The venturi-shaped passage 66 accelerates the flow of resin and induces a jet effect past the nose, which promotes combination of the two materials and also a positive flow away from the catalyst entry point. The flow of the resin in this manner also provides, as stated before, a wiping action over the nose face and sweeps the catalyst stream toward the discharge port. In actual operation, the valve in the resin line is opened first, and resin flows through its passages toward the discharge port. Then the catalyst valve is opened, and catalyst flows out, coming in contact with the interior core of the resin stream just forward of the end of the needle valve. At the conclusion of any operating cycle, the catalyst valve is closed first, shutting off the flow of catalyst, and resin is allowed to flow until it has wiped the surface of the tip of the needle clean.

When the residual catalyst material has been wiped clean from the nose and has been sent off to waste through the mixing chamber 100, the resin flow may be shut off and the combining valve may be removed from the system. If desired, it may be disassembled and cleaned of both the resin and catalyst materials remaining in the separate passageways, since neither of these materials will solidify permanently without mixing with the other.

From the outlet passage 65 the preliminary mixed materials are conducted to the mixing chamber 100 which constitutes the subject matter of the present invention. Simple injection is not enough to achieve thorough uniformity in the product and assure completion of the chemical reaction within the necessary time. Slow mixing would result in some of the material becoming fully cured before other material had even been mixed with the catalyst, and it is essential in this kind of operation to achieve complete mixing and to achieve it very quickly. That is the reason for the mixing chamber 100. Under-catalyzed and over-catalyzed mixtures are unsatisfactory and coatings of such mixtures are unsatisfactory and unusable. The materials employed will not mix with sufficient homogeneity when sprayed together into the air from two separate jets.

The mixing chamber 100 comprises a tube 101 with an inlet end 102 connected to the outlet passage 65 of the combining valve 60, and an outlet 103. Within the tube 101 is an axially-positioned spindle shaft 104 on which are mounted a plurality of perforated annular baffles 105 as shown in FIGS. 2 and 3. Each baffle 105 has a central perforation 106 that fits snugly around the axial spindle 104 and also a series of perforations 107. The outer periphery 108 of each baffle 105 is spaced from the inner periphery 109 of the tube 101 by a small clearance. For example, I have used a $13/16''$ diameter tube 101 that is $5\frac{1}{4}''$ long with a $5/8''$ inside diameter and baffles 105 with an outer diameter of $9/16''$, so that the clearance on each side is 1/32". In the examples shown, six baffles 105 were spaced 5/8" apart and 3/4" in from each end of the tube 101.

However, use of the spindle-baffle-tube combination is not sufficient. Such devices as that shown in Rogers Patent Number 1,023,397, with a spindle and several perforated discs or screens will not satisfactorily combine viscous epoxy resins and their catalysts. I have tried experiments using structures of this type and my own device as so far described, but the results were unsatisfactory. When colored ingredients were used to see what happened, they showed that even after the material had passed through the full length of the tube, the two viscous ingredients were still in separate filament-like streams. There were several streams, but the whole showed stripes rather than blending.

Therefore, the present invention provides shredded metal packing 110 which loosely fills the spaces 111 between baffles 105 and the inlet end 102 of the tube 101. Also, the packing 110 is arranged to extend around the peripheries 108 of the baffles 105. The last baffle 105 rests on a shoulder 113 of the tube 101 and prevents movement of the spindle or rod 104 and the other baffles 105. Thus, the catalyst and resin previously combined in the valve 60 enter the mixing chamber 100 through the inlet port 102 and pass successively through sections of the shredded metal 110, through the openings 107 in the baffles 105, or around the outer edges 108 of the baffles 105. The shredded packing 110 preferably consists of random interlaced ribbons of metal having sharp edges. They induce mixing of the ingredients by changes in the direction of flow of the liquids by impingement against the flat faces of the ribbon and by the shearing action on the viscous fluids of the sharp edges of this ribbon structure.

Unless the packing 110 is made to extend in ribbons having sharp edges and is continuous, extending around the baffle peripheries, satisfactory mixing cannot be obtained. Simply packing steel wool between perforated discs, as in the Thompson Patent Number 2,715,045 or using the lath turnings confined in a tube, as in Taber et al, Patent Number 2,894,732, does not work satisfactorily, for the viscous fluids pack these substances against the far end of the chamber and block the further passage of the materials. By extending the metal ribbons around the baffles 105, this blocking effect is prevented, for there is continuity and the ribbons remain in place, as mere steel wool will not.

A good way of putting these sharp-edged ribbons into place is to wind a group of them together spirally around the spindle 104 and baffles 105. This assures good mixing and prevents blocking, as shown in FIG. 4.

Thus the axial spindle 104 directly impedes the axial movement of the central portion of the fluid stream where it will be remembered, the catalyst tends to be concentrated, and therefore assures that all the catalyst will be sent around the spindle 104 where it necessarily will do some mixing with the plastic. The baffles 105 assure that at intervals the material will have to move out radially and either go around the outer periphery 108 or through the perforations 107, which are preferably only 1/16" wide. Not only that, but this viscous liquid must move past the sharp metal ribbons which cut, slice and recombine the material, so that within the short space of slightly more than 5", thorough mixing is achieved. The baffles 105 thus serve three functions: (1) they impede the straight-line flow of the combined fluid; (2) they change the direction of the fluid flow by forcing travel through the perforations 107 or around their outer edges 108; and (3) they prevent the ribbons of shredded packing material 110 from moving with the flowing liquid and piling up at the discharge end of the mixing chamber 100.

Proportions are important in this mixing chamber, for chambers of size too large will result in premature catalyzation and solidification of the heated and mixed materials. Some of the materials have a pot life of a very few seconds at elevated temperatures. Small sizes, that is, short chambers, do not provide adequate mixing. Generally speaking, it has been found that the length of the mixing chamber, when used with epoxy resins, should be between 4" and 6" with optimum conditions at around 5".

After passing through the mixing chamber 100 the materials may be fed directly through a discharge head 120, which applies the material to a target. Normally this will be a spray gun and it has been found that, once the already-described elements in the combination have been used, a standard paint spray gun utilizing compressed air to atomize the viscous material may be used. Such a gun is shown in U.S. Patent 2,470,718 and is sold as De Vilbiss type GA-502. However, other makes of similar type may be used. The shut-off valve 121 or trigger of the gun 120 is locked in open position during application to prevent any danger of the catalyzed mixture from solidifying in its passageways adjacent the nozzle 122. For liquid applications, a discharge head permitting liquid flow is preferred to a spray. For spray applications in confined interior spaces such as small-diameter piping or tubing a rotating spray head may be used.

To illustrate the application of the invention, a specific example may be given. The resin ingredient in the container 10 may be made of epoxide resin solutions sold by Shell Chemical Corporation under the name of Epon 820. One hundred parts by weight of the Epon may be combined with 25 parts of a filler such as titanium dioxide, 5 parts of a reactive, flow-control agent such as uren formaldehyde resin, and 3 parts of a reactive accelerating agent such as Bisphenol A (p,p'-isopropylidenediphenol). These parts are inert among themselves but do result in a very thick, viscous, paste-like composition. The container 11 may contain the catalyst, which may be chosen from various amines but the preferable one currently is metaphenylene diamine. These are to be combined so that there will be 100 parts of Epon 820 per 15 parts of metaphenylene diamine. A tolerance of only 5% is permissible; so the metaphenylene diamine can vary only from 15 parts by plus or minus .75 part. The ratio of the resin ingredient to the catalyst ingredient, as shown, will therefore be 100 to 11.3.

The two ingredient materials in their separate containers 10 and 11 are heated in the water bath and electrically heated parts to approximately 175° F. and simultaneously the pump chamber and the transmission lines are raised in temperature to between 150° F. and 175° F. The proportioning pump 22 is adjusted to the required ratio between the ingredients to give the aforesaid ratio, and the separate materials are flowed from the containers to the entrances to the respective cylinders of the duplex pump. The pump 22 operates at a fixed rate of speed, and the strokes of both pistons are simultaneous, both being adjusted to supply the correct proportions of the ingredients. The pump 22 propels the liquid materials through the separate, heated, nonexpansible conduits 50 and 51 to the combining valve 60 where they are combined and forced directly from there into the mixing chamber 100 and thence directly to the discharge apparatus.

With the shut-off valves and the two hoses 50 and 51 closed, the return valves 44, 45 are opened to allow the liquids to bypass the hose system and to circulate between the pump 22 and the ingredient containers 10 and 11. When the hose shut-off valves are open (remembering first to open the resin valve and then to open the catalyst valve), the liquids flow into the combining valve 60, thence to the mixing chamber 100, and the application head 120. At shut-off time, as said before, the catalyst valve is shut off first and resin is flushed to clean off the valve and the mixing chamber before it is shut off.

During operation, the materials are kept hot, the temperatures being varied to effect viscosities that produce equal pressures in both lines 50 and 51. For instance, using the ingredients already given, a pressure of 30 p.s.i. may be obtained in both lines by keeping the resin in line 50 at about 185° F. and the catalyst in line 51 at about 155° F. When the pressures are equal, any mechanical restriction due to variations in air presure in the gun, twisted lines, kinks, or the like have an equal effect on each component, and proper proportioning is maintained.

The use of the internal wires 54, 55 as the heaters means that the temperatures can be set and maintained at optimum of variations in the input voltage to the lines and regardless of the ambient temperature on the conduits 50 and 51. For example, the conduits may be fifty feet long, may be used outdoors on hot or cold days, may lie partially in water or partially inside a heated tank or building.

The combination of the ingredients at their elevated temperatures not only assures proper viscosities and pressure conditions in the line but also means that the curing is accelerated and the finished mixture is at least partially cured before it strikes the target. So it takes less time for it to cure after striking the target and there is less flow on the target after it strikes.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

A mixing chamber comprising a tube, a spindle within said tube, a plurality of baffles mounted along said spindle, the outer peripheries of said baffles having a narrow clearance away from the inner surface of said tube, said baffles also having small passageways intermediate said spindle and said outer peripheries, and sharp-edged continuous packing means said continuous packing means consisting of threaded metal ribbons intertwined loosely filling the spaces between baffles and between said spindle and said inner periphery of said tube, and extending around the baffles from space to space, so that when viscous material is forced from one end of said tube to the other, it is forced to flow radially outwardly by said spindle and by said baffles to the peripherial clearances and said passageways and is forced to fold in, divide, and mix together by said packing means while said baffles prevent the packing means from being forced out of said chamber.

References Cited in the file of this patent

UNITED STATES PATENTS

| | | |
|---|---|---|
| 1,144,040 | Keller | June 22, 1915 |
| 2,715,045 | Thompson | Aug. 9, 1955 |
| 2,748,802 | Hanson et al. | June 5, 1956 |
| 2,802,648 | Christensen et al. | Aug. 13, 1957 |
| 2,894,732 | Taber et al. | July 14, 1959 |